3,835,074
JOINT CEMENT COMPOSITIONS
Armand J. Desmarais, New Castle, Del., assignor to
Hercules Incorporated, Wilmington, Del.
No Drawing. Filed Apr. 26, 1973, Ser. No. 354,713
Int. Cl. C08f 37/16, 45/18
U.S. Cl. 260—17                                                 3 Claims

ABSTRACT OF THE DISCLOSURE

Joint cements suitable for use with plaster wallboard are disclosed wherein the asbestos customarily used to impart water binding properties and pseudoplasticity is replaced by a water-insoluble, fibrous hydroxyethyl cellulose.

This invention relates to compositions useful as joint sealing materials for the installation of wallboard paneling in, e.g., residential and office building construction. More specifically, it refers to such compositions wherein a cellulose derivative is employed to impart desirable properties thereto.

Since the end of the second World War, the use of wallboard has all but displaced plaster in erection of interior walls in the construction of buildings. Wallboard is generally installed in 4 x 8 foot panels which are nailed and glued to the studding of the wall and fitted together until the entire section of wall is covered. The joints where sections of the board are butted together are covered with tape and then taped joints and all nails are covered with a joint cement or "spackling" compound which, upon hardening, can be sanded smooth so that it is imperceptible under paint or wallpaper.

Joint cements heretofore employed with wallboard have contained a resinous binder, limestone, clay, mica and asbestos the principal ingredients which are mixed with water to form a dope. Asbestos is included in these formulations for several purposes. It imparts lubricity, workability, water binding, and pseudoplasticity to the wet mix and, being fibrous, provides reinforcement of the cement on drying.

Recently disclosed evidence that certain types of asbestos may have carcinogenic characteristics has prompted issuance of severely restrictive regulations by OSHA regarding its use in construction applications and may eventually lead to its being banned altogether. For this reason, an effort is now under way to find substitutes to replace asbestos in most of its present applications.

In recent work by the instant inventor, it has been found that cellulose derivatives can be used as a replacement for asbestos in joint cement. More specifically, this invention relates to joint cement compositions based on a resinous binder, mica, clay, and limestone as major dry components, along with a fibrous, water-insoluble hydroxyethyl cellulose having an M.S. between about 0.15 and 1.4. Joint cements are maketed in fully formulated, ready-to-use form, i.e., already containing water, and as a dry powder to which water is added at the time of use. The invention includes such dry powders as well as the fully formulated cements. Joint cement compositions of this invention are substantially identical in performance to those which are presently available commercially and, based on current price levels, they are competitive in price.

In commercial practice the concentrations of the principal ingredients can and do vary widely between suppliers and depending on the intended end use, i.e., whether it is for patching holes, covering nail pops, or for initially covering taped joints. Most commercial formulations are within the following concentration ranges:

Calcium carbonate, 190 to 350 parts by weight.
Mica, 30 to 90 parts by weight.
Clay, 0 to 100 parts by weight.
Binder, 20 to 44 parts by weight.

If the product is to be sold as a ready-mix formulation, water in the amount of about 30 to 40%, based on the total weight of the dry ingredients, is added and thoroughly mixed. All compositions within the limits just described are suitable for manual application by troweling. When they are to be applied mechanically, additional water is added at the job site just prior to use.

The cellulose derivatives which can be employed in this invention are water-insoluble, fibrous materials as distinguished from the conventional fibrous hydroxyethyl cellulose of commerce which is water-soluble. Water insolubility is assured either by maintaining the M.S. at a low level, i.e., below about 1.2, or by the use of hydroxyethylation techniques which produce a nonuniformly substituted product. The water insolubility is a critical factor in the performance of the hydroxyethyl cellulose as an asbestos substitute. A water-soluble material such as conventional hydroxyethyl cellulose, at economical concentration levels, would not impart the consistency needed for the pseudoplasticity normally obtained with asbestos.

The above paragraph must not be taken to mean that no water-soluble hydroxyethyl cellulose is to be employed. Water-soluble hydroxyethyl cellulose is frequently included as a thickener in limestone based joint cements and can be so used in the compositions of this invention. It is only the hydroxyethyl cellulose employed in substitution for asbestos that need be water insoluble.

To duplicate properties of conventional joint cements, the concentration of the water-insoluble hydroxyethyl cellulose can be from about an equal quantity to $\frac{1}{12}$ that of the asbestos being replaced, depending on the M.S. of the hydroxyethyl cellulose used. If the M.S. of the hydroxyethyl cellulose is in the range of 0.15 to 0.6, the concentration employed can be in the range of 1% to 9% based on the dry weight of the formulation. Due to the superior water-binding capacity of the cellulose derivative having an M.S. in the range of 0.6 to 1.2, the concentration of the additive which is effective can be about 0.5 to 1.5% based on the total dry weight of the formulation. Thus, the concentration of the additive can be about 0.5 to 9% based on the total dry weight of the formulation. Employing conventional joint cement recipes, the additional weight of asbestos, not replaced by cellulose derivative, is replaced by additional limestone or mica so that the total weight of product remains the same.

As suggested previously, it is important that the hydroxyethyl cellulose be in fibrous form. For best results the fiber length should be between about 0.03 and 0.007 inch. If the fiber length becomes too great, the resulting cement composition is curdy and not satisfactory. On the other hand, if the fibrous form is lacking, the water-binding capacity of the hydroxyethyl cellulose is not sufficient to reproduce the properties of conventional joint cements.

In some cases, the hydroxethyl cellulose alone can give the composition sufficient body for application to a vertical wall without sagging or melt-down. In other cases, a structure additive can be added to increase the body to the necessary level. Materials useful as structure additives for this purpose include, e.g., cellulose fibers in various forms, treated clays, and porous stone flour. When structure additives of this type are added, they normally replace a portion of one of the inert fillers, i.e., limestone, mica, or clay.

The resinous binder is normally a coalescable vinyl material, preferably poly(vinyl acetate) which upon drying or curing of the cement forms a thin matrix to hold the clay, limestone, etc. When a fully formulated mix is being prepared, the binder is usually added as aqueous latex. In the case of dry mixes it is added as spray dried latex particles. Other materials useful as the binder include, e.g., starch, casein, polyacrylamide, and copolymers of acrylamide and acrylic acid.

In addition to the principal ingredients mentioned above, a typical joint cement will frequently also contain a small amount of a dispersant, a defoamer, a preservative and a thickener.

In the following examples, the invention is illustrated. Parts and percentages are by weight unless otherwise indicated. The following general procedure was employed to mix the ingredients.

In preparing a ready mix formulation the water and binder latex were charged to a mixing apparatus and mixed for a short time before the dispersant, defoamer, and preservative were added. The dry ingredients (limestone, mica, clay, hydroxyethyl cellulose, and structure additives, if used) were dry blended and added incrementally to the stirred liquid. After the last of the dry ingredients was added, the mix was stirred for about another 10 minutes at low speed with occasional stopping to scrape down the sides of the bowl.

To characterize the products prepared in the examples, the following tests were used.

VISCOSITY

Measured in Brabender units (B.U.) determined by ASTM 474–67, Sections 2 and 3.

CRACKING

Panels were dried in an essentially vertical position with a current of air from a 14 inch oscillation fan forced across their face from about 30 inches for 45 minutes. The panels were then allowed to dry overnight in the vertical position without the air current. Ratings were assigned subjectively as: none (N), very slight (V.S.), slight (S), moderate (M), or heavy (H).

MELT-DOWN

Panels of the cement about 4" x 5" x ⅛" were cast. Melt-down was observed as sag at the edges of the panels. Ratings—Excellent: structure of cast panel is retained with sharp edges. Slight: Edges of panel are slightly rounded. Moderate: Edges are slightly more rounded. Poor: Edges of panel are smooth and tapered.

ADHESION

By ASTM test C 474–67.

CONTROL EXAMPLE

This control example is intended to illustrate the properties of a conventional joint cement employing asbestos as a water retention aid. The following standard joint cement formulation was prepared using the procedures set forth above.

| | Parts |
|---|---|
| Limestone (98% CaCO$_3$) | 250 |
| Mica (325 mesh) | 76 |
| Clay | 76 |
| Latex binder | 61 |
| Dispersant | 4 |
| Preservative | 0.2 |
| Water | 280 |
| Defoamer | 4.6 |
| Hydroxyethyl cellulose [1] | 2 |
| Asbestos (5–1000μ) | 48 |

[1] Water-soluble grade, M.S. 2,5, 2000 cps. viscosity in 1% aqueous solution.

The latex binder was a 55% by weight aqueous dispersion of poly(vinyl acetate) containing a plasticizer. The dispersant was a polymerized sodium salt of a sulfonic acid sold under the trade name Daxad 30. The defoamer was a silica dispersion in a hydrocarbon solvent. The preservative was a mercurial fungicide compound.

Examples 1 to 11

The procedure and the formulation set forth for the control example were repeated using the following insoluble hydroxyethyl cellulose modifications in place of asbestos. The fine, fluffy fibers are all within the 0.03 to 0.007 in. range—i.e., they passed through a 20-mesh screen and were held on 80-mesh.

Example 1

Asbestos was replaced with 48 grams of hydroxyethyl cellulose having M.S. 0.32, in the form of fine, fluffy fibers having water retention power of 10 g./g.

Example 2

Asbestos was repleced with 48 grams of hydroxyethyl cellulose having M.S. of 0.4 in the form of fine, fluffy fibers having water retention power of 10 g./g.

Example 3

Asbestos was replaced with 24 parts of limestone and 24 parts of hydroxyethyl cellulose having M.S. of 0.4 in the form of fine, fluffy fibers having water retention power of 10 g./g.

Example 4

Asbestos was replaced with 44 parts of limestone and 4 parts of hydroxyethyl cellulose having M.S. of 0.82 in the form of fine, fluffy fibers having water retention power of 19 g./g.

Example 5

Asbestos was replaced with 40 parts of limestone and 8 parts of hydroxyethyl cellulose having M.S. of 0.82 in the form of fine, fluffy fibers having water retention power of 19 g./g.

Example 6

Asbestos was replaced with 40 parts of limestone and 8 parts of hydroxyethyl cellulose having M.S of 0.78 in the form of fine, fluffy fibers having water retention power of 18 g./g.

Example 7

Asbestos was replaced with 42 parts of limestone and 6 parts of hydroxyethyl cellulose having M.S. of 0.78 in the form of fine, fluffy fibers having water retention power of 18 g./g.

Example 8

Asbestos was replaced with 42.7 parts of limestone and 5.3 of hydroxyethyl cellulose having 0.88 M.S. in the form of fine, fluffy fibers having water retention power of 20 g./g.

Example 9

Asbestos replaced by 40 parts of limestone and 8 parts of hydroxyethyl cellulose having an M.S. of 0.81 in the form of fine, fluffy fibers having water retention power of 19 g./g.

Example 10

Asbestos replaced by 48 parts of hydroxyethyl cellulose having an M.S. of 0.82 in the form of fine, fluffy fibers having water retention power of 19 g./g.

Example 11

Asbestos replaced by 48 parts of hydroxyethyl cellulose having an M.S. of 0.15, having water retention power of 5 g./g., prepared by fibrillation of a pressed sheet into fibers greater than 0.033 in.

The properties of the above Control Example and Examples 1 through 11 are recorded in the following table.

consistency, exhibited slight cracking and very slight melt-down.

| Example number | Viscosity | Density (lbs./gal.) | Cracking | Melt-down | Aphesion | Appearance |
|---|---|---|---|---|---|---|
| Control | 560 | 12.42 | Slight | N | Excellent | Creamy. |
| 1 | 700 | | | S | Satisfactory | Smooth. |
| 2 | 800 | | | S | do | Do. |
| 3 | 400 | | | M | do | Thin. |
| 4 | 490 | 12.8 | None | S | do | Smooth-creamy. |
| 5 | 800 | 12.7 | do | V.S. | do | Slightly grainy but usable. |
| 6 | 820 | 12.7 | do | S | do | Smooth-heavy. |
| 7 | 770 | 12.7 | do | S | do | Smooth. |
| 8 | 700 | 12.8 | do | S | do | Do. |
| 9 | 860 | 12.8 | do | S | do | Do. |
| 10 | >1,000 | 12.8 | | | Too viscous to be tested | |
| 11 | 600 | | | V.S. | Satisfactory | Fibrous and curdy. |

Examples 12–17

Using the recipe set out above, additional joint cement compositions were prepared in which some of the asbestos was replaced with a mixture of low M.S. hydroxyethyl cellulose, acicular attapulgite clay and talc and the remainder with additional limestone.

Example 12

One part of hydroxyethyl cellulose having 0.82 M.S., 2 parts clay and 4 parts talc. Product was slightly grainy, but exhibited only slight cracking and excellent melt-down.

Example 13

One part hydroxyethyl cellulose having 0.41 M.S., 2 parts clay and 9 parts talc. Product had smooth, creamy consistency and exhibited only moderate cracking and slight melt-down.

Example 14

One part hydroxyethyl cellulose having 0.53 M.S., 2 parts clay and 9 parts talc. Product had smooth creamy consistency and exhibited no cracking and slight melt-down.

Example 15

One part hydroxyethyl cellulose having 0.63 M.S., 2 parts clay and 9 parts talc. Product had smooth, creamy consistency, exhibited no cracking and slight melt-down.

Example 16

One part hydroxyethyl cellulose having 0.8 M.S., 2 parts clay and 9 parts talc. Product had smooth, creamy slightly more viscous consistency, exhibited no cracking and very slight melt-down.

Example 17

One part hydroxyethyl cellulose having 0.82 M.S., 1.2 parts clay and 5.2 parts talc. Product had smooth, creamy

Example 18

The following ingredients were dry mixed by tumbling:

| | Parts |
|---|---|
| Limestone | 29 |
| Mica | 76 |
| Clay | 76 |
| Binder [1] | 34 |
| Hydroxyethyl cellulose [2] | 2.5 |
| Hydroxyethyl cellulose [3] | 4 |

[1] Spray dried poly(vinyl acetate) latex.
[2] M.S. 2.5, 2000 cps. in 1% water solution.
[3] M.S. 0.82, fibers of 0.03 to 0.007 in., water retention of 19 g./g.

The dry blended ingredients were mixed with 280 parts of water, the mix was allowed to slake for 20 minutes and was then mixed again to a uniform consistency and evaluated as in the previous examples. Results were as follows:

| | |
|---|---|
| Viscosity | 560. |
| Density | 12.8. |
| Cracking | N. |
| Melt-down | V.S. |
| Adhesion | Satisfactory. |
| Appearance | Smooth-creamy. |
| Structure | Good. |

What I claim and desire to protect by Letters Patent is:
1. A joint cement composition consisting essentially of a coalescable vinyl resin binder, mica, clay, and limestone as its principal dry ingredients and containing about 0.5 to 9% by weight, based on the total weight of the dry components, of fibrous, water-insoluble hydroxyethyl cellulose having a hydroxyethyl M.S. of about 0.6 to 1.2.
2. The composition of claim 1 wherein the hydroxyethyl cellulose has a hydroxyethyl M.S. of about 0.6 to 1.2 and is present in a concentration of about 0.5 to 1.5%.
3. The composition of claim 1 wherein the hydroxyethyl cellulose has a hydroxyethyl M.S. of about 0.15 to 0.6 and is present in a concentration of about 1 to 9%.

References Cited
UNITED STATES PATENTS

| | | | |
|---|---|---|---|
| 3,382,119 | 5/1968 | Henkel | 260—17 |
| 3,411,926 | 11/1968 | Gogek | 106—214 |
| 3,044,973 | 7/1962 | Segro | 260—39 R |
| 2,816,872 | 12/1957 | Yourtee | 260—15 |

THEODORE MORRIS, Primary Examiner

U.S. Cl. X.R.

106—141